United States Patent
Chen et al.

(10) Patent No.: US 7,522,241 B2
(45) Date of Patent: *Apr. 21, 2009

(54) CONTINUOUS DOMAIN VERTICAL ALIGNMENT LIQUID CRYSTAL DISPLAY

(75) Inventors: Chueh-Ju Chen, Miao-Li (TW); Jia-Pang Pang, Miao-Li (TW); Chiu-Lien Yang, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 343 days.

This patent is subject to a terminal disclaimer.

(21) Appl. No.: 10/982,521

(22) Filed: Nov. 4, 2004

(65) Prior Publication Data
US 2005/0105015 A1  May 19, 2005

(30) Foreign Application Priority Data
Nov. 14, 2003 (TW) .............................. 92131961 A

(51) Int. Cl.
G02F 1/1337 (2006.01)
G02F 1/1343 (2006.01)

(52) U.S. Cl. ..................................... 349/129; 349/141
(58) Field of Classification Search ................. 349/141, 349/129, 130, 146, 144
See application file for complete search history.

(56) References Cited
U.S. PATENT DOCUMENTS 5,434,690 A * 7/1995 Hisatake et al. ................ 349/8
6,141,077 A * 10/2000 Hirata et al. ................. 349/143
6,342,939 B1 * 1/2002 Hirata et al. ................. 349/143
6,424,398 B1 7/2002 Taniguchi
6,750,933 B1 * 6/2004 Yakovenko et al. .......... 349/129
6,930,740 B2 * 8/2005 Yoon et al. ................... 349/129
7,019,806 B2 * 3/2006 Um et al. ..................... 349/129
2004/0090581 A1 * 5/2004 Song et al. ................... 349/129
2005/0078250 A1 * 4/2005 Chen et al. ................... 349/129
2005/0078251 A1 * 4/2005 Chen et al. ................... 349/129
2005/0128409 A1 * 6/2005 Lee ............................. 349/141
2006/0023149 A1 * 2/2006 Lin et al. ..................... 349/129

FOREIGN PATENT DOCUMENTS

CN 01121750 1/2002

* cited by examiner

Primary Examiner—James A Dudek
(74) Attorney, Agent, or Firm—Wei Te Chung

(57) ABSTRACT

A liquid crystal display (2) has a first substrate (21), a second substrate (22), and liquid crystal molecules (26) interposed between the substrates. Curved first slits (211) and curved second slits (221) are defined at insides of the substrates respectively. When an electric field is applied between the substrates, the liquid crystal molecules are inclined to be oriented parallel to the substrates. In addition, the curved first slits and the curved second slits affect the orientations of the liquid crystal molecules, such that the liquid crystal molecules are directed to incline in various directions in smooth continuums. The visual effect of the continuous domain vertical alignment liquid crystal display is the sum of multiple smooth continuous domains. Thus the continuous domain vertical alignment liquid crystal display provides a more even display performance at various different viewing angles.

3 Claims, 7 Drawing Sheets

CONTINUOUS DOMAIN VERTICAL ALIGNMENT LIQUID CRYSTAL DISPLAY

CROSS-REFERENCE TO RELATED APPLICATION

This application is related to U.S. patent application Ser. No. 10/962,290, filed on Oct. 9, 2004.

BACKGROUND OF THE INVENTION

1. Field of the Invention

The present invention relates to vertical alignment liquid crystal displays (LCDs), and more particularly to a continuous domain vertical alignment type of liquid crystal display.

2. Description of Prior Art

A liquid crystal display utilizes the optical and electrical anisotropy of liquid crystal molecules to produce an image. The liquid crystal molecules have a particular passive orientation when no voltage is applied thereto. However, in a driven state, the liquid crystal molecules change their orientation according to the strength and direction of the driving electric field. A polarization state of incident light changes when the light transmits through the liquid crystal molecules, due to the optical anisotropy of the liquid crystal molecules. The extent of the change depends on the orientation of the liquid crystal molecules. Thus, by properly controlling the driving electric field, an orientation of the liquid crystal molecules is changed and a desired image can be produced.

The first type of LCD developed was the TN (twisted nematic) mode LCD. Even though TN mode LCDs have been put into use in many applications, they have an inherent drawback that cannot be eliminated; namely, a very narrow viewing angle. By adding compensation films on TN mode LCDs, this problem can be ameliorated to some extent. However, the cost of the TN mode LCD is increased. Therefore, MVA (multi-domain vertical alignment) mode LCDs have recently been developed. In MVA mode liquid crystal displays, each pixel is divided into multiple domains. Liquid crystal molecules of a pixel are vertically aligned when no voltage is applied, and are inclined in different directions according to the domains when a voltage is applied. Thus MVA mode liquid crystal displays can provide wide viewing angles. Typical MVA mode liquid crystal displays have four domains in a pixel, and employ protrusions and/or slits at the pixels to achieve the desired effects.

Referring to FIGS. 6 and 7, Chinese Pat. Application No. 01,121,750, published on Jan. 23, 2002, discloses a four-domain MVA liquid crystal display. The MVA liquid crystal display 1 comprises a first substrate 11, a second substrate 12, a plurality of liquid crystal molecules 16 disposed between the first and second substrates 11, 12, and protrusions 111, 121 each having a triangular cross-section respectively disposed on the first and second substrates 11, 12. Components such as two polarizers having orthogonal polarization directions, pixel electrodes, common electrodes, thin film transistors and alignment films are also provided in the MVA liquid crystal display 1; however, these components are not shown in FIG. 6 or FIG. 7.

FIG. 6 shows the alignment directions of the liquid crystal molecules 16 when the MVA liquid crystal display 1 is in an off state; that is, when no voltage is applied. Most of the liquid crystal molecules 16 are vertically aligned perpendicular to the substrates 11, 12. Accordingly, light beams do not change their polarization states when passing through the liquid crystal molecules 16. The two polarizers are disposed on the substrates 11, 12 respectively. Because the polarization directions of the polarizers are orthogonal to each other, light beams transmitting from the first polarizer maintain their original polarization states and are absorbed by the second polarizer. In other words, the MVA liquid crystal display 1 is in a dark state when no voltage is applied.

FIG. 7 shows the orientation directions of the liquid crystal molecules 16 when the MVA liquid crystal display 1 is in an on state; that is, when a voltage is applied. An electric field perpendicular to the substrates 11, 12 is generated. Because the liquid crystal molecules 16 have negative dielectric anisotropy, they are oriented in directions perpendicular to the electric field. In addition, the protrusions 111, 121 affect the orientation of the liquid crystal molecules 16. For example, the liquid crystal molecules 16 at two opposite sides of the protrusion 111 are respectively oriented from top-right to bottom-left and from top-left to bottom-right. Therefore the light beams change their polarization states when passing through the liquid crystal molecules 16. Because the polarization directions of the polarizers are orthogonal to each other, the light beams with altered polarization states pass through the second polarizer. In other words, the MVA liquid crystal display 1 is in a white state when a voltage is applied.

FIG. 8 shows orientation directions of the liquid crystal molecules 16 in four domains A, B, C, D. The protrusions 111, 121 are arranged on the substrates 11, 12 along generally V-shaped paths. Liquid crystal molecules 16 at two opposite sides of the upper portions (as viewed in FIG. 8) of the protrusions 111, 121 incline in C and D directions, while liquid crystal molecules 16 at two opposite sides of the lower portions (as viewed in FIG. 8) of the protrusions 111, 121 incline in A and B directions. The orientation directions of the liquid crystal molecules 16 in a same inter-protrusion region are consistent. The orientation direction of the liquid crystal molecules 16 in each same inter-protrusion region is orthogonal to the orientation directions of the liquid crystal molecules 16 in all of the other inter-protrusion regions. Therefore, each pixel attains a visual effect that is an overall result of four domains. This gives the MVA liquid crystal display 1 a more even display performance at various different viewing angles.

However, the four-domain configuration can only compensate visual performance in four directions. The overall viewing angle characteristics of the MVA liquid crystal display 1 are still inherently limited, and the MVA liquid crystal display 1 cannot satisfactorily present a uniform display at all viewing angles.

It is desired to provide a vertical alignment mode liquid crystal display which overcomes the above-described problems.

SUMMARY OF THE INVENTION

An object of the present invention is to provide a vertical alignment liquid crystal display which has improved wide viewing angle characteristics.

A liquid crystal display in one embodiment of the present invention comprises a first substrate, a second substrate, and liquid crystal molecules interposed therebetween. A plurality of curved first slits and a plurality of curved second slits are defined at insides of the first substrate and the second substrate respectively.

When an electric field is applied between the first and second substrates, the liquid crystal molecules are inclined to be oriented parallel to the first substrate. In addition, the curved first slits and the curved second slits affect the orientations of the liquid crystal molecules, such that the liquid crystal molecules are directed to incline in various directions in smooth continuums. The visual effect of the continuous domain vertical alignment liquid crystal display is the sum of multiple smooth continuous domains. Thus the liquid crystal display can provide a more even display performance at various different viewing angles compared to a conventional MVA liquid crystal display.

Other objects, advantages, and novel features of the present invention will become more apparent from the following detailed description when taken in conjunction with the accompanying drawings, in which:

DETAILED DESCRIPTION OF THE INVENTION

Figure 1:
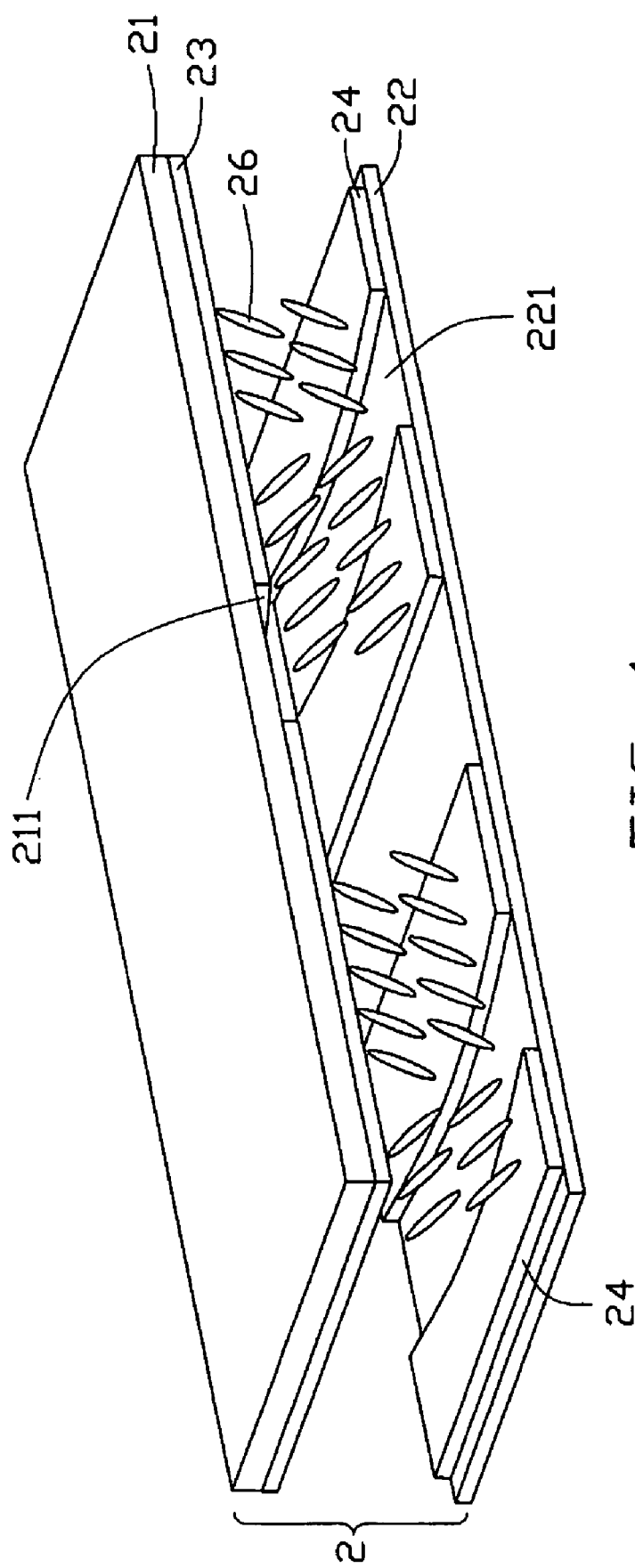
FIG. 1 is a schematic, isometric view of part of a continuous domain vertical alignment liquid crystal display (LCD) according to a first embodiment of the present invention, showing the LCD in an on state.
Figure 3:
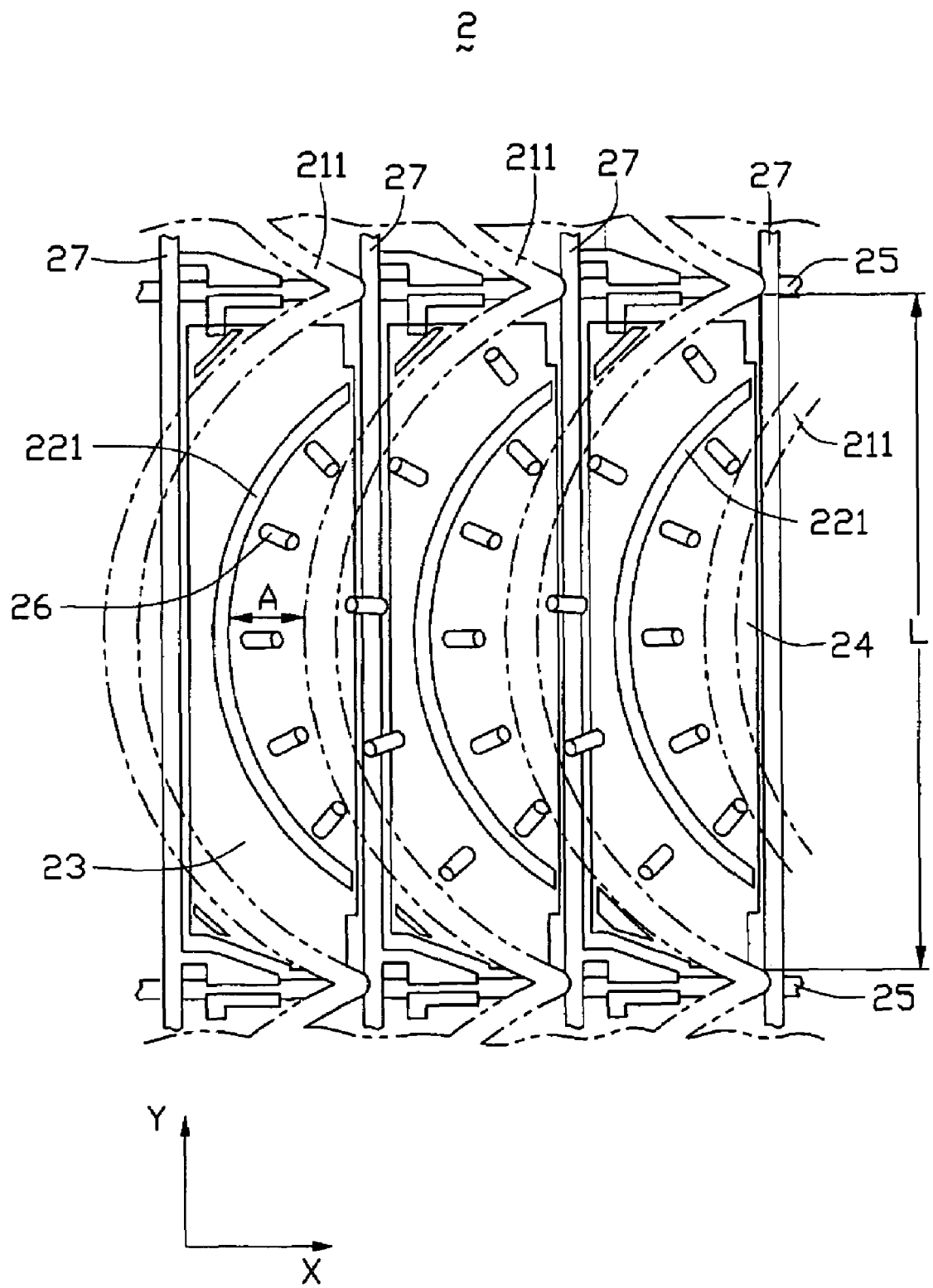
FIG. 3 is a schematic, top elevation of part of the LCD according to the first embodiment of the present invention in the on state, but not showing a first substrate thereof, and showing orientations of liquid crystal molecules thereof.

Referring to FIGS. 1 and 3, part of a continuous domain vertical alignment liquid crystal display (LCD) 2 according to the first embodiment of the present invention is shown. The LCD 2 comprises a first substrate 21, a second substrate 22, liquid crystal molecules 26 interposed between the first and second substrates 21, 22, and a plurality of gate lines 25 and data lines 27 formed on the second substrate 22. A common electrode 23 is formed on the first substrate 21, and a plurality of pixel electrodes 24 is formed on the second substrate 22. A plurality of first slits 211 is defined in the common electrode 23, and a plurality of second slits 221 is defined between the pixel electrodes 24. Each of the first slits 211 and the second slits 221 has a curved shape, and defines a rectangular cross-section. Typically, widths of the first slits 211 are larger than widths of the second slits 221. Preferably, the widths of the first slits 211 are about 10 microns, and the widths of the second slits 221 are about 7.5 microns.

When the LCD 2 is in an on state, a voltage is applied thereto, and the common electrode 23 and the pixel electrodes 24 generate an electric field perpendicular to the first substrate 21 and the second substrate 22. The liquid crystal molecules 26 have negative dielectric anisotropy, and are therefore inclined to be oriented parallel to the first substrate 21. In addition, the first slits 211 and the second slits 221 affect the orientations of the liquid crystal molecules 26, such that the liquid crystal molecules 26 form continuums of inclined alignments perpendicular to the curvatures of the second slits 221 and the curvatures of the first slits 211. The visual effect of the LCD 2 is the sum of multiple smoothly continuous domains. Thus the LCD 2 provides a more even display performance at various different viewing angles compared to the conventional MVA liquid crystal display 1.

Figure 2:
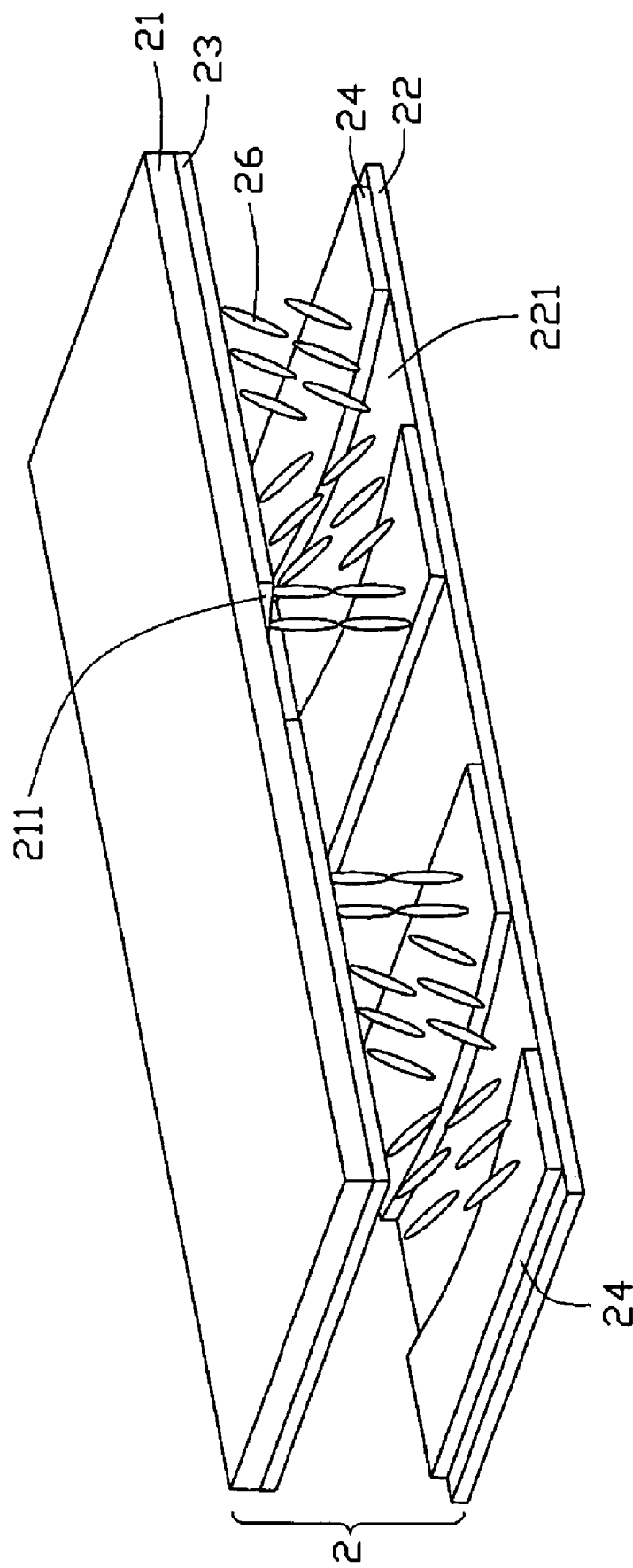
FIG. 2 is similar to FIG. 1, but showing the LCD in an off state.

Referring to FIG. 2, the LCD 2 in an off state is shown. That is, when no voltage is applied, most of the liquid crystal molecules 26 between the first substrate 21 and the second substrate 22 are aligned in vertical directions. Therefore light beams passing between the first and second substrates 21, 22 do not change their polarization states.

Referring to FIG. 3, the orientations of the liquid crystal molecules 26 of the LCD 2 are shown. The gate lines 25 and data lines 27 formed on the second substrate 22 provide gate signals and data signals respectively. The first slits 211 and the second slits 221 cooperate with the electric field generated by the common electrode 23 and the pixel electrodes 24 to direct the liquid crystal molecules 26 to incline in various directions in smooth continuums.

According to the foregoing, a Cartesian coordinate system can be defined, with the X axis being parallel to the gate lines 25 and the Y axis being parallel to data lines 27. A path defining the shape of each first slit 211 and each second slit 221 satisfies the following equation:

$$x = A \sin(\pi^* y/L), (0 \leq y \leq L) \quad (1)$$

wherein x and y are Cartesian coordinates of any point along the path. 'A' is a constant number, which is the horizontal interval between each adjacent first slit 211 and second slit 221. 'L' is a length of the first slit 211 or the second slit 221 along the Y axis, as shown in FIG. 3.

Figure 4:
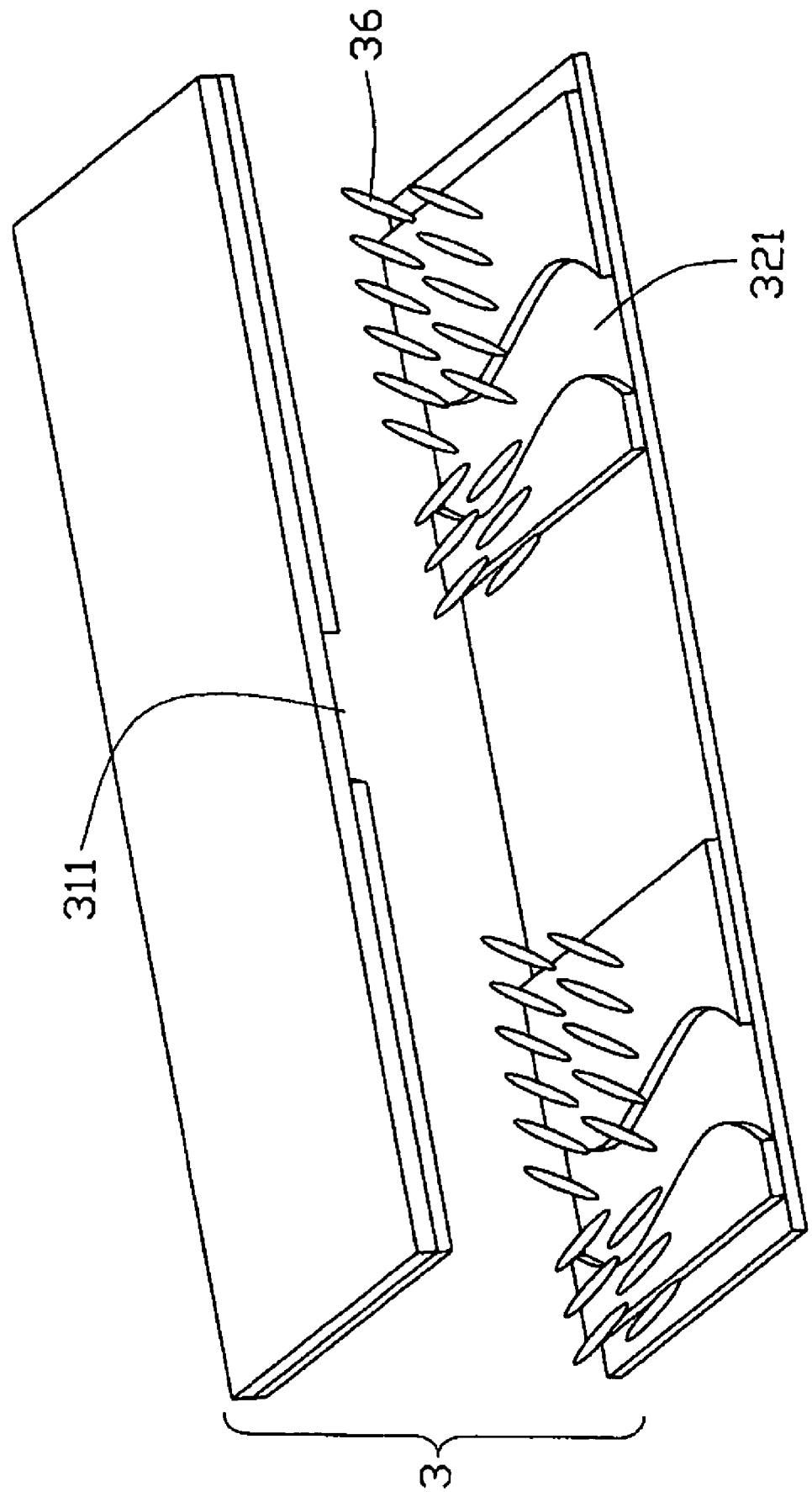
FIG. 4 is a schematic, exploded isometric view of part of a continuous domain vertical alignment liquid crystal display (LCD) according to a second embodiment of the present invention, showing the LCD in an on state.

FIG. 4 is a view of a continuous domain vertical alignment liquid crystal display (LCD) 3 according to the second embodiment of the present invention, showing the LCD 3 in an on state. A Cartesian coordinate system can be defined, in similar fashion to that described above in relation to the LCD 2. A path defining a wavy shape of each of first slits 311 and each of second slits 321 satisfies the following equation:

$$x = A \sin(\pi^* y/2L), (0 \leq y \leq L) \quad (2)$$

wherein x and y are Cartesian coordinates of any point along the path. 'A' is a constant number, which is the horizontal interval between each adjacent first slit 311 and second slit 321. 'L' is a length of the fist slit 311 or the second slit 321 along the Y axis.

The wavy shapes of the first slits 311 and second slits 321 affect the orientations of liquid crystal molecules 36, such that the liquid crystal molecules 36 are directed to incline in various directions in smooth continuums. The visual effect of the LCD 3 is the sum of multiple smooth continuous domains. Thus the LCD 3 provides a more even display performance at various different viewing angles compared to the conventional MVA liquid crystal display 1, and even compared to the LCD 2.

Figure 5:
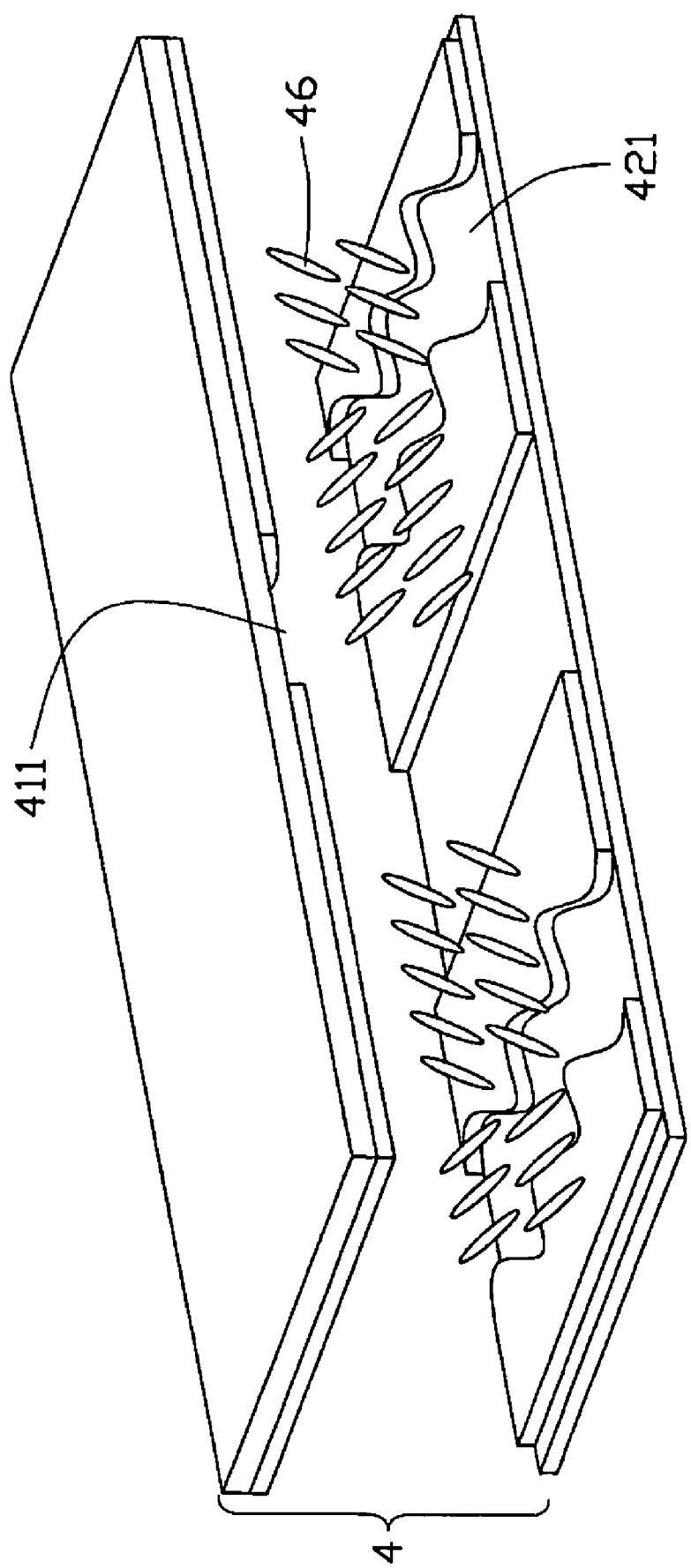
FIG. 5 is a schematic, exploded isometric view of part of a continuous domain vertical alignment liquid crystal display (LCD) according to a third embodiment of the present invention, showing the LCD in an on state.
Figure 6:
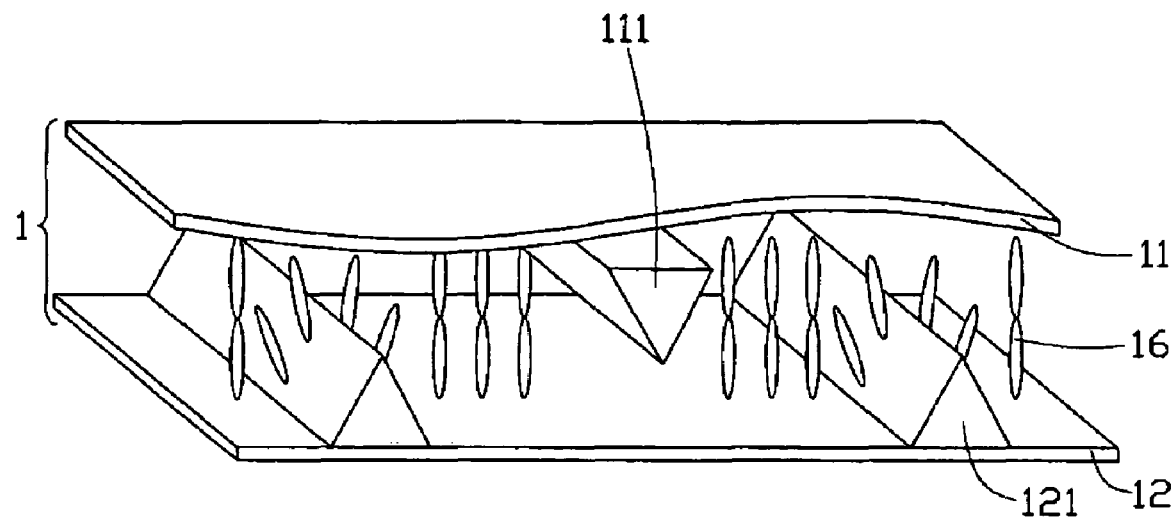
FIG. 6 is a schematic, isometric cutaway view of part of a conventional MVA liquid crystal display (LCD), showing the LCD in an off state.
Figure 7:
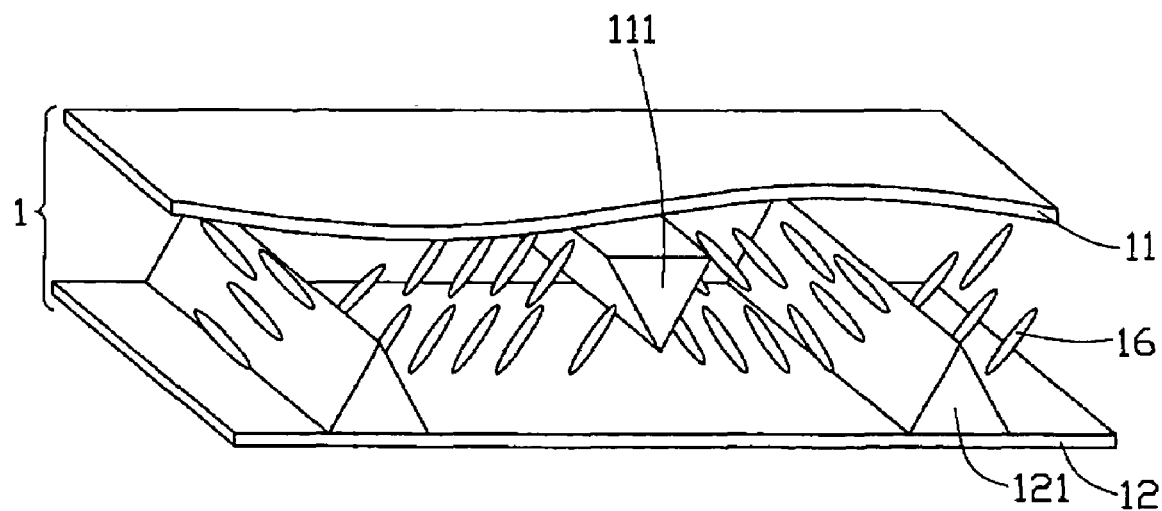
FIG. 7 is similar to FIG. 6, but showing the LCD in an on state.
Figure 8:
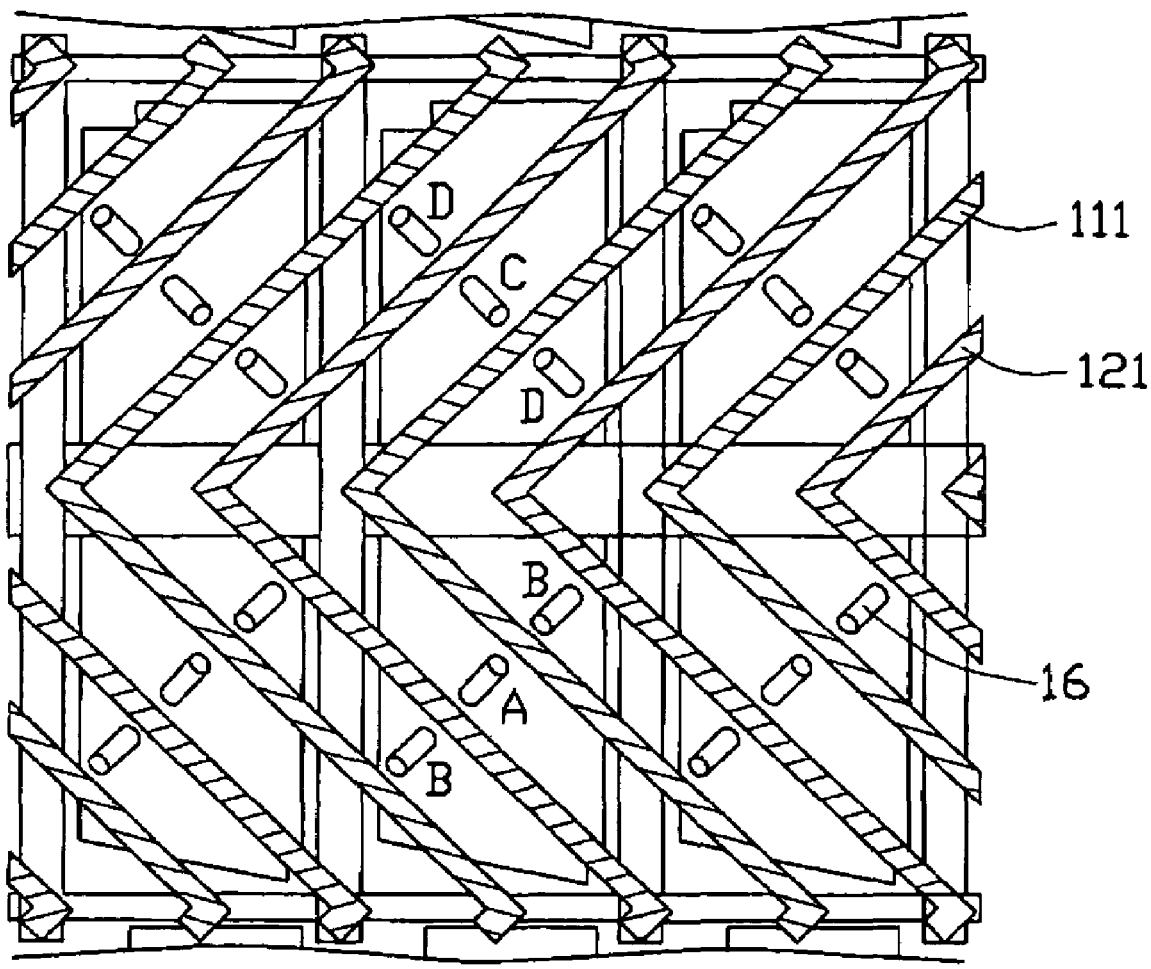
FIG. 8 is a schematic, top elevation of part of the conventional MVA LCD in the on state, but not showing a first substrate thereof, and showing orientations of liquid crystal molecules thereof.
Figure 8:
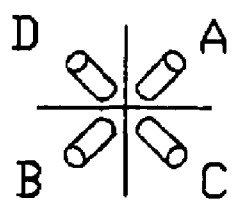

FIG. 5 is a view of part of a continuous domain vertical alignment liquid crystal display (LCD) 4 according to the third embodiment of the present invention, showing the LCD 4 in an on state. A Cartesian coordinate system can be defined, in similar fashion to that described above in relation to the LCD 2. A path defining a wavy shape of each of first slits 411 and each of second slits 421 satisfies the following equation:

$$x = A \sin(\pi^* y/nL), (0 \leq y \leq L, n > 2, \text{ and } n \text{ is a natural number}) \quad (3)$$

wherein x and y are Cartesian coordinates of any point along the path. 'A' is the horizontal interval between each adjacent first slit 411 and second slit 421. 'L' is a length of the first slit 411 or the second slit 421 along the Y axis.

The wavy shapes of the first slits 411 and second slits 421 affect the orientations of liquid crystal molecules 46, such that the liquid crystal molecules 46 are directed to incline in various directions in smooth continuums. The visual effect of the LCD 4 is the sum of multiple smooth continuous domains. Thus the LCD 4 provides a more even display performance at various different viewing angles compared to the conventional MVA liquid crystal display 1, and even compared to the LCDs 2 and 3.

The continuous domain vertical alignment liquid crystal display of the present invention is not limited to the above-described embodiments. For example, each of the first slits 211 and the second slits 221 can be arcuate. Each of the first slits 311 and the second slits 321 can be "S" shaped. Each of the first slits 411 and the second slits 421 can be wavy, comprising multiple "S" shapes.

It is to be further understood that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

The invention claimed is:

1. A liquid crystal display, comprising:
a first substrate and a second substrate, and liquid crystal molecules interposed between the first and second substrates;
a common electrode and a pixel electrode disposed at insides of the first and second substrates, respectively; and
a plurality of curved first slits and a plurality of curved second slits disposed at the common and pixel electrodes of the first substrate and the second substrate respectively, wherein widths of the first slits are larger than corresponding widths of the second slits;
wherein the width of each first slit is 10 microns, and the width of each second slit is 7.5 microns.

2. A liquid crystal display, comprising:
a first substrate and a second substrate, and liquid crystal molecules interposed between the first and second substrates;
a common electrode and a pixel electrode disposed at insides of the first and second substrates, respectively; and
a plurality of curved first slits and a plurality of curved second slits disposed at the common and pixel electrodes of the first substrate and the second substrate respectively;
wherein the first slits face corresponding second slits, respectively, widths of the first slits are larger than corresponding widths of the second slits, and the first and second slits cooperate to assist the formation of a continuum of multiple domains of orientation of the liquid crystal molecules when the continuous domain vertical alignment liquid crystal display is in an on state; and
wherein the width of each first slit is 10 microns, and the width of each second slit is 7.5 microns.

3. The liquid crystal display of claim 1, wherein a path defining the shape of each first and second slit satisfies the following equation:

$$x = A \sin(\pi^* y/nL), (0 \leq y \leq L, n \text{ is a natural number})$$

wherein x and y are Cartesian coordinates of any point along the path. 'A' is a constant number being the interval between each adjacent first and second slit, and 'L', is a length of the first slit or the second slit along the Y axis.

* * * * *